United States Patent [19]

Drushel

[11] 3,772,603

[45] Nov. 13, 1973

[54] STRUCTURE FOR AND METHOD OF PULSE AMPLITUDE DETECTION

[75] Inventor: Robert W. Drushel, Farmington, Mich.

[73] Assignee: Ex-Cell-O Corporation, Detroit, Mich.

[22] Filed: July 6, 1971

[21] Appl. No.: 163,530

Related U.S. Application Data

[62] Division of Ser. No. 583,875, Oct. 3, 1966, Pat. No. 3,591,851.

[52] U.S. Cl. ............ 328/108, 307/233, 307/235 R, 328/109, 328/111

[51] Int. Cl. ........................ H03k 5/18, H03k 5/20

[58] Field of Search ........................ 307/232–235, 328/109, 111, 108, 115

[56] References Cited

UNITED STATES PATENTS

| | | | |
|---|---|---|---|
| 3,209,212 | 9/1965 | Billings | 307/233 X |
| 3,069,558 | 12/1962 | Burt et al. | 307/233 |

*Primary Examiner*—John Zazworsky
*Attorney*—L. Gaylord Hulbert et al.

[57] ABSTRACT

A highly sensitive and completely stable circuit for and method of detecting low amplitude, short duration direct current signal variations associated with sparking between an electrode tool and a conducting workpiece in an electrochemical machining process or the like and substantially immediately producing a control signal in response to a predetermined detected signal level is disclosed. The structure includes a polarity discriminating sensing circuit for initially detecting the signal variations, an amplifier circuit for providing an amplified and stabilized signal substantially immediately on sensing a signal variation of the proper polarity and output circuit for providing an output signal in response to a selected portion of the amplified and stabilized signal, including means for selecting the level of the selected signal portion operable to provide the output signal, means for cutting off the amplified and stabilized signal when the selected level is below a predetermined minimum and means responsive to a number of amplified and stabilized signals, which have a level below the selected level received in a predetermined time for providing an output signal.

4 Claims, 2 Drawing Figures

STRUCTURE FOR AND METHOD OF PULSE AMPLITUDE DETECTION

This application is a division of application, Ser. No. 583,875, filed Oct. 3, 1966 U.S Pat. No. 3,591,851.

The invention relates to electronic control circuits and refers more specifically to a highly sensitive and completely stable circuit for and a method of detecting ionized paths associated with sparking and the like or shorts between an electrode tool and a conducting workpiece in an electro chemical machining process or the like and producing a control signal in response to a predetermined detected signal level.

In electrical circuits it is sometimes desirable to be able to detect ionized paths, such as are associated with sparking in the circuit, and to provide a control signal in response thereto. Thus for example in electro chemical machining, sparking between the tool and workpiece is objectionable. Should such sparking reach a predetermined amplitude or should a short circuit develop between the tool and workpiece the workpiece may be permanently damaged.

Sparks which occur between the tool and workpiece during electro chemical machining are generally of low amplitude and very short duration. Prior control circuits and methods have generally not been sensitive enough to these signals to detect them and to provide an output control signal in response thereto in time to prevent damage thereby. In addition prior control circuits and methods of sensing sparks have not usually been selective as to polarity of signals detected and have often disregarded selecting the level of sparking which will produce a control signal. Also, the control circuits and methods of the past have generally not provided an output control signal in response to sparks occurring in a given time which are below the selected signal level at which a single spark will provide a control signal.

It is therefore one of the objects of the present invention to provide an improved electronic control circuit for detecting ionized paths due to sparking or the like or shorts in an electric circuit and providing an output control signal in response thereto.

Another object is to provide a control circuit as set forth above responsive only to detected signals having a predetermined polarity.

Another object is to provide a control circuit as set forth above which operates to provide an output signal within a few microseconds of detecting a spark having at least a selected minimum signal level.

Another object is to provide a control circuit as set forth above which is responsive to the number and magnitude of sparks detected thereby in relation to time.

Another object is to provide a control circuit as set forth above and further including means for selecting the spark signal level to which the control circuit is responsive and for deenergizing the control circuit when the sparks to which the circuit is responsive, as determined by the means for selecting the spark signal level, have over a predetermined maximum signal level.

Another object is to provide an electronic control circuit for detecting sparks between a workpiece and tool in an electro chemical machining process and providing an output signal responsive thereto comprising means for detecting low amplitude, short duration, negative going electrical signals, means for amplifying and stabilizing the detected signals and means responsive to the signal level and number of signals in relation to time which are detected for producing an output signal in response to the amplified and stabilized signals including means for adjusting the sensitivity of the control circuit.

Another object is to provide an improved method of detecting sparking in an electric circuit and providing an output control signal in response thereto.

Another object is to provide a method as set forth above including detecting only electric signals having a predetermined polarity and providing an output signal only when the detected electric signals are of a predetermined signal level or are of a lesser signal level and occur close together.

Another object is to provide a circuit for and method of detecting sparks and providing an output control signal in response to selected detected sparks which is simple, economical and efficient.

These and other objects and features of the invention will become apparent as the description proceeds especially when taken in conjunction with the accompanying drawing illustrating a prederred embodiment of the invention wherein.

Figure 1:
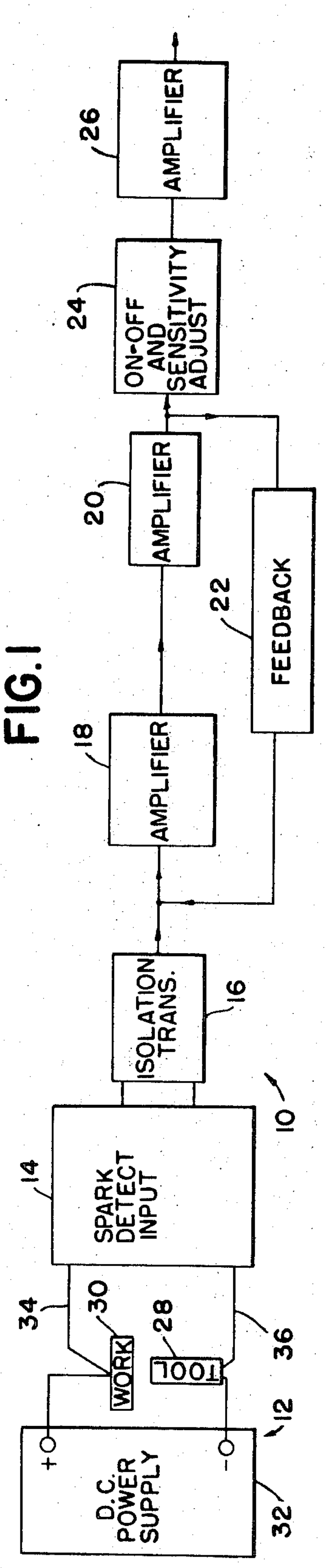
FIG. 1 is a block diagram of an electronic control circuit constructed in accordance with the invention for practicing the method of the invention in combination with apparatus for electro chemical machining of conductive workpieces.

With particular reference to figures of the drawing, one embodiment of the present invention will now be considered in detail.

As shown in FIG. 1, the electronic control circuit 10 is illustrated connected to electro chemical machining apparatus 12. The electronic control circuit 10 includes the spark detect input circuit 14, the isolation transformer 16, amplifiers 18 and 20, feedback circuit 22, the on-off and sensitivity adjust circuit 24, and the amplifier 26 connected as shown in FIG. 1.

In operation the input circuit develops an electric signal representative of and in response to a spark between the tool 28 and work 30 in circuit with the electro chemical machining apparatus 12. The developed signal is then transferred from the input circuit 14 to amplifier 18 through isolation transformer 16. The signal from isolation transformer 16 is amplified and stabilized by the amplifiers 18 and 20 and the feedback circuit 22. The output of the amplifier 20 is then passed through the on-off and sensitivity adjust circuit 24 and is used to trigger the amplifier 26 to provide an output control signal. The output control signal from the amplifier 26 may be used to turn off the power supply 32 of the electro chemical machining apparatus 12 to prevent damage to the workpiece 30 or perform other control functions as desired.

More specifically as set forth above the electro chemical machining apparatus 12 includes a direct current power supply which may provide for example, up to 10,000 amperes at 0 to 20 volts. These values are not limiting on the power supply since the power supply may have both a higher voltage and current output. As shown in FIG. 1 the electrode tool 28 is connected to the negative side of the power supply 32 while the workpiece 30 is connected to the positive side of the power supply.

Such power supplies, tools and workpieces are well known and will not therefore be considered in further detail herein. In the usual operation of electro chemical machining apparatus an electrolyte is maintained between the tool and workpiece and a space is maintained between the tool and workpiece as the tool and workpiece are advanced toward each other, whereby electro chemical machining of the workpiece takes place.

In such machining as indicated above if the tool and the workpiece come too close to each other, sparking or arcing will occur therebetween or if the space between the tool and workpiece is bridged or partially bridged by a conducting particle a spark or arc will occur between the tool and workpiece. These sparks or arcs if sustained or repeated may seriously damage the workpiece. However, it is sometimes desirable to permit infrequent sparks of low intensity since more rapid machining may be accomplished with the tool and workpiece close enough together and at a power supply setting sufficient to periodically cause a short duration, low amplitude spark. Thus for roughing in a workpiece, low amplitude, short duration sparks occurring at infrequent intervals will not injure the workpiece sufficiently to require suppression of the cutting circuit due to the sparks. Further, in such machining should sparks be caused by a condition which will ultimately cause a power arc which arc is extremely detrimental to the workpiece there will be a plurality of short, low amplitude sparks immediately preceding the arc.

It is therefore desirable to provide an output control signal on detecting a spark of a predetermined signal level between the tool 28 and workpiece 30 and on detecting a plurality of sparks of lower signal level occurring at intervals indicating an impending power arc. Thus, the control circuit 10 has been connected between the electrode tool 28 and workpiece 30 as illustrated in FIG. 1 to provide a control output signal on sensing of a spark having a signal level above a predetermined selectable signal level and on occurrence of sparks which may have a lower signal level than the selected predetermined level but which occur close together.

Figure 2:
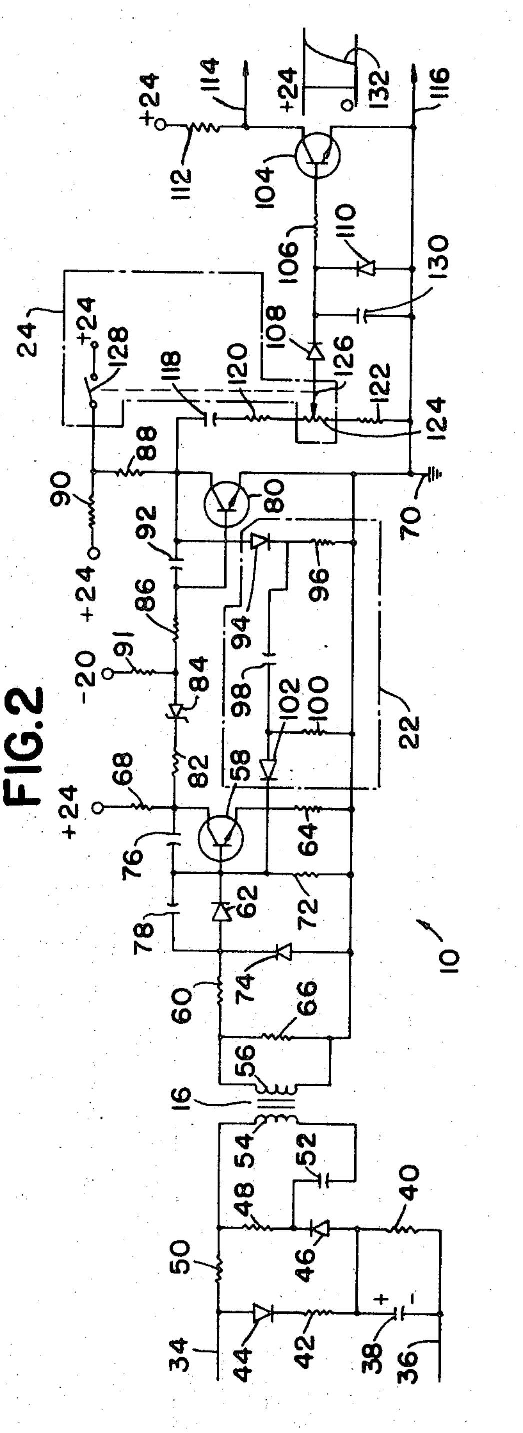
FIG. 2 is a schematic diagram of the electronic control circuit illustrated in FIG. 1.

The spark detect input circuit 14 connected across the tool 28 and the workpiece 30 by the conductors 34 and 36 includes the capacitor 38 having a bleed resistor 40 thereacross, a charging circuit for the capacitor 38 including the resistor 42 and diode 44 and a discharge circuit for the capacitor 38 including the diode 46 and the resistors 48 and 50 connected as shown in FIG. 2.

In operation, the capacitor 38 is charged through the diode 44 and resistor 42 to the voltage level of the power supply output across the tool 28 and workpiece 30. The charge on the capacitor 38 may have the ripple of the power supply thereon. The capacitor 38 will thus be charged with the polarity shown in FIG. 2 during normal machining with the electro chemical machining apparatus 12.

When a spark occurs between the tool 28 and workpiece 30 the capacitor 38 starts to discharge through the diode 46, resistance 48 and resistance 50 due to the negative going signal resulting from a short duration low amplitude dip in the voltage level between the workpiece and tool. Thus an output signal will appear across the resistor 48 every time a spark appears between the workpiece and tool.

It will be particularly noted that the output signal across the resistor 48 is present only during a negative going spark so that positive going trigger pulses for the power supply and the like will not be sensed by the input circuit 14. The inclusion of the diodes 44 and 46 in the input circuit 14 thus discriminates against electric signals having a predetermined polarity occurring between the tool and workpiece so that the input circuit 14 is sensitive primarily to conditions between the tool and workpiece which may be detrimental to proper electro chemical machining.

The signals sensed across the resistor 48 are coupled through the capacitor 52 into the primary winding 54 of the isolation transformer 16 which is connected across the resistance 48 in series with the capacitor 52 as shown in FIG. 2. The isolation transformer 16 further includes the secondary winding 56 one end of which is connected to the base of transistor 58 through resistor 60 and diode 62 and the other end of which is connected to electric common 70. The secondary winding of the transformer 16 is loaded with the transformer load resistor 66. Transformer 16 serves to isolate the spark detect, input circuit 14 from the rest of the electronic control circuit 10 to insure proper spark signal pickup by the input circuit.

Amplifier 18 includes the transistor 58 having a collector connected to a positive, 24 volt, direct current electrical energy source through resistor 68, an emitter connected to one side of transformer 56 through resistor 64 and a base connected to the other side of the transformer 56 through the resistor 60 and the diode 62 as set forth above. The base of the transistor 58 is returned to electronic common 70 through the resistor 72 across which a feedback signal is fed to the transistor 58 from the feedback circuit 22 which will be considered subsequently. In addition, a protecting diode 74 is provided across the base emitter circuit of transistor 58 to limit the signal applied to the transistor 58 and capacitors 76 and 78 are provided around the collector to base circuit of the transistor 58 and around the diode 62 in the base circuit of the transistor 58.

In operation, the transistor 58 is normally biased off with no signal transferred through the isolation transformer 16 indicating no sparks between the tool and workpiece. On occurrence of an input signal to the transistor 58 from the isolating transformer 16 the transistor 58 switches to an on condition whereby the signal on the collector of the transistor 58 changes abruptly from a high positive potential close to the positive 24 volt source of electric energy to which it is connected to a low positive potential close to electronic common 70. Thus in response to a spark occurring between the tool 28 and workpiece 30 the amplifier 18 changes output signal from a high positive output signal to a considerably lower positive output signal.

Amplifier 20 includes the transistor 80 the collector of which is connected through a resistor 88 and resistor 90 to the positive 24 volt electrical energy source and the emitter of which is connected to electronic common 70. The base of the transistor 80 is connected to the collector of the transistor 58 through resistor 82, Zener diode 84 and resistor 86. The capacitor 92 prevents high frequency feedback between the collector and base of the transistor 80.

In operation the transistor 80 is normally on due to the high positive voltage on the collector of the normally off transistor 58 applied to the base of the transistor 80. Wheñ the transistor 58 is turned on the base of the transistor 80 is driven negative by the negative signal applied thereto through the resistor 91 and resistor 86 from the negative 20 volt electrical energy source. The signal on the collector of the transistor 80 is thus changed from a low positive potential which is substantially electronic common to a relatively high positive potential approaching the positive 24 volt energy source to which the collector is connected through the resistors 88 and 90.

The switching off of the transistor 80 is particularly rapid due to the inclusion of the Zener diode 84, resistor 91, resistor 68 and resistor 82 in between the positive 24 volt power source and the negative 20 volt power source. Thus the Zener diode will pass the positive voltage from the 24 volt power source to the transistor 80 to bias the transistor in an on condition when the voltage at the collector of transistor 58 is close to 24 volts positive since the voltage drop thereacross is approximately 5 volts. However, the voltage at the collector of the transistor 58 need only start dropping toward electronic common so that the differential across the Zener diode is below the cut-off potential of the Zener diode to provide a negative signal through the resistor 91 on the base of the transistor 80 to turn the transistor off. Thus it is not necessary for the signal on the collector of the transistor 58 to go all the way to electronic common before a negative potential of substantial value is applied to the base of transistor 80.

The feedback circuit 22 includes the diode 94, resistor 96, capacitor 98, resistor 100 and diode 102 connected as illustrated best in FIG. 2. The positive signal from the collector of the transistor 80 is thus fed back through diodes 94 and 102 across condenser 98 to the base of transistor 58. The positive signal feedback to the base of the transistor 58 reinforces the incoming signal from the isolation transformer 16 so that the final output of the transistor 80 at the collector thereof is a greatly amplified and stabilized pulse with reference to the input signal to the transistor 58 from the input circuit 14.

The output signal from the amplifier 20 is fed through the on-off and sensitivity adjust circuit 24 to the base of the transistor 104 of amplifier 26. Amplifier 26 includes the transistor 104 having a base connected to the on-off and sensitivity adjust circuit 24 through the resistor 106 and protective diode 108 across the diode 110 which limits the signal that may be applied to the base of the transistor 104. The collector of the transistor 104 is connected through the load resistor 112 to the positive 24 volt electrical energy source while the emitter of transistor 104 is connected to electronic common.

When the transistor 104 is in an off condition a signal which is substantially 24 volts positive will be provided between the output conductors 114 and 116. When the transistor 104 is turned on the signal at the collector of the transistor 104 goes sharply toward electronic common voltage.

The on-off and sensitivity adjust circuit 24 as shown best in FIG. 2 includes the capacitor 118 and the resistors 120 and 122 and the variable resistance 124 having the wiper arm 126. The resistances 120, 122 and 124 are connected in series as shown and are coupled to the output of the transistor 80 across the resistances 88 and 90 by the coupling capacitor 118. Thus any predetermined portion of the signal output of the amplifier 20 may be coupled to the transistor 104 of amplifier 26 by selecting the position of the wiper arm 126 on the variable resistor 124.

In operation the transistor 104 may be made to turn on in response to different signal levels from the amplifier 20. Thus it may be that for example in rough machining where a predetermined level of sparking will not damage the work materially the wiper arm 126 will be set to pass only a small portion of the output of amplifier 20 to the transistor 104 whereby a larger spark would be necessary to provide the voltage required to fire the transistor 104. The sensitivity of the control circuit 10 is thus adjustable.

In addition it will be noted that the variable wiper arm 126 is indicated as mechanically connected to a switch 128 which is in parallel with the resistor 90 to a positive 24 volt power source. The interaction of the wiper arm 126 and switch 128 is such that with the wiper arm 126 set so that the sensitivity of the control circuit 10 is so low that there is no value in operating the control circuit 10, the switch 128 is opened so that the amplifier 20 is always on and there will never be an output control signal from the electronic control circuit 10.

Regardless of the sensitivity adjustment of the wiper arm 126 on resistor 124 if the signals from the transistor 80 to the capacitor 130 through the diode 108 occur often enough, even though they are of lower signal level than that normally required to turn the transistor 104 on, the signals will step charge the capacitor 130 to create a potential thereon sufficient to turn the transistor 104 on. Thus the capacitor 130 will be step charged by signals from amplifier 20 which are insufficient in themselves to turn on the transistor 104 but which when integrated on the capacitor 130 will provide a voltage sufficient to turn the transistor 104 on to provide an output control signal between the conductors 114 and 116.

The output signal from the transistor 104 will be substantially as shown at 132. The voltage on the collector of the transistor 104 will drop sharply from approximately 24 volts to electronic common or approximately 0 volts on turning on of the transistor 104 and will remain there while the capacitor 130 discharges through the resistor 106 and transistor 104. The voltage on the collector of the transistor 104 will then rise as the base of the transistor 104 gradually returns to a level which will cut the transistor 104 off.

Thus in overall operation with the electro chemical machining apparatus 12 operating normally, the workpiece 30 and tool 28 will have a predetermined gap therebetween with electrolyte therein and no sparking or arcing will occur thereacross. Should a spark occur between the tool and workpiece for any reason, that is the tool and workpiece become too close to each other or some electrically conducting material get into the gap between the tool and workpiece, the charge on the capacitor 38 which normally is charged to the voltage across the gap between the tool and workpiece through the diode 44 and resistor 42 will start to discharge through the diode 46 and resistor 48 due to the substantially lower voltage between the workpiece and tool on a spark occurring therebetween to produce an output signal across the resistor 48 which is detected by the isolation transformer 16 coupled to the input circuit 14 through the capacitor 52.

The detected output signals across the resistor 48 which are not excluded by diode 74 and which vary in amplitude and duration are transferred by the isolation transformer 16 to the amplifier 18 which is normally in an off condition to turn the amplifier 18 on. When the amplifier 18 is turned on the voltage on the collector of the transistor 58 of amplifier 18 will be dropped from substantially 24 volts with the transistor 58 off to substantially 0 volts with the transistor 58 on. As soon as the voltage on the collector of the transistor 58 goes toward 0 volts the voltage difference across the Zener diode 84 is quickly reversed and the large negative potential from the negative voltage supply source through the resistor 92 will place a large negative bias on the base of the transistor 80 in the amplifier 20 to turn the amplifier 20, which is normally on, off very sharply.

Turning off of the transistor 80 produces an output at the collector thereof which rises from substantially 0 volts to substantially 24 volts positive. The output of the transistor 80 is fed back through the feedback circuit 22 to reinforce the input signal to the transistor 58 whereby the output signal of the transistor 80 is amplified and stabilized with respect to the relatively low amplitude, short duration, unstable signal fed to the amplifier 18 from the input circuit 14 as the result of a spark between the workpiece and tool.

The output signal from the amplifier 20 is fed through the on-off and sensitivity adjust circuit 24 which is set to provide a portion of the output from the amplifier 20 at the amplifier 26 sufficient to turn the amplifier 26 on at a predetermined spark level. By selecting the position of the wiper arm 126 of the on-off and sensitivity adjust circuit 24 it is possible to provide an output signal across the conductors 114 and 116 at substantially any spark energy level desired between the workpiece and tool.

Should the sensitivity level of the control circuit 10 be set so low that it is undesirable to have the circuit 10 in operation at all the switch 128 will be opened by the adjustment of the sensitivity adjusting wiper arm 126 so that the transistor amplifier 20 will remain on at all times and no signal will be provided to turn the amplifier 26 on and provide an output control signal from the circuit 10.

In addition, if the signals from the amplifier 20 are spaced closely together, such as is the case of a plurality of short duration sparks of low amplitude insufficient normally in themselves to provide a signal to turn the transistor 104 on, which usually occur before a short circuit or power arc, the individual sparks will step charge the capacitor 130 to provide a voltage on the capacitor 130 sufficient to turn the transistor 104 on and provide an output signal therefrom.

The output signal from the control circuit 10 it will be understood may be used to control the electro chemical machining apparatus 12 in any convenient manner such as by cutting the power supply 32 off and lighting a light indicating that the power supply has been cut off due to undesirable arcing or sparking. Such control may be through a simple relay or may be through convenient electronic circuits and electronic switching as desired. Since such circuits are known or may be provided by the ordinary designer and provide no part of the present invention they will not be considered in detail herein.

While one embodiment of the present invention has been considered in detail it will be understood that other embodiments and modifications thereof are contemplated. It is therefore the intention to include all embodiments and modifications as are defined by the appended claims within the scope of the invention.

What I claim as my invention is:

1. An electronic circuit comprising a voltage divider circuit for receiving an input signal thereacross, an output circuit responsive to a signal of a predetermined value, means for tapping a predetermined portion of the input signal from the voltage divider and coupling it to the output signal circuit, means for providing a signal of the predetermined magnitude to the output signal circuit in response to receipt of a plurality of the predetermined input signal portions of less than the predetermined value in a predetermined time connected between the means for tapping a predetermined portion of the input signal from the voltage divider and the output circuit and means connected to the means for tapping a predetermined portion of the input signal for inhibiting the input signal when the tapped predetermined portion of the input signal is less than a minimum portion of the input signal.

2. Structure as set forth in claim 1 wherein the means for tapping a predetermined portion of the input signal comprises a rheostat in the voltage divider circuit having a movable wiper arm and a diode and resistor connected in series with the wiper arm of the rheostat between the voltage divider circuit and output circuit.

3. Structure as set forth in claim 2 wherein the means for providing an output signal in response to a plurality of small input signals occurring in a predetermined time comprises a diode and capacitor connected in parallel between one end of the voltage divider circuit and the junction between the diode and resistor in series with the wiper arm of the rheostat.

4. Structure as set forth in claim 2 wherein the means for inhibiting the input signal comprises a switch connected to the wiper arm of the rheostat operable to open on movement of the wiper arm of the rheostat to a predetermined position in one direction.

* * * * *